Aug. 27, 1957 E. C. SCHURCH ET AL 2,804,506

DYNAMAGNETIC PICK-UP SYSTEM

Filed Oct. 31, 1951 2 Sheets-Sheet 1

Edward C. Schurch,
Ferber R. Schleif,
INVENTORS

BY H. L. Godfrey
ATTORNEY

DYNAMAGNETIC PICK-UP SYSTEM

Filed Oct. 31, 1951 2 Sheets-Sheet 2

Edward C. Schurch,
Ferber R. Schleif,
INVENTORS

BY H. L. Godfrey
ATTORNEY 2,804,506

DYNAMAGNETIC PICK-UP SYSTEM

Edward C. Schurch and Ferber R. Schleif, Denver, Colo.

Application October 31, 1951, Serial No. 254,184

6 Claims. (Cl. 179—100.2)

(Granted under Title 35, U. S. Code (1952), sec. 266)

The invention described herein may be manufactured and used by or for the Government of the United States for governmental purposes without payment to use of any royalty thereon in accordance with the provisions of the act of April 30, 1928 (ch. 460, Stat. L. 467).

This invention relates to means for the translation of intelligence from a magnetic record thereof, and aims generally to improve the same.

In the translation of magnetic recordings as heretofore practiced, various problems have been encountered among which may be mentioned (1) the inconvenience and delay occasioned by the use of a photographic process for the recording of transient phenomena translated by the Duddell type oscillograph or the cathode ray oscillograph in the present technique of oscillography. (2) The absence of any provision for automatic oscillographic recording in which the record includes conditions just prior to the beginning of a transient as well as the transient itself. (3) The variation of pick-up output voltage with frequency and with variation of velocity of the magnetic recording medium past the pick-up head.

In the known technique of the magnetic recording art, the sound or other intelligence has been recorded by producing remanent magnetism upon tapes, wires, discs, or other media. In producing oscillations from such magnetic records, a certain useful range in the variation of remanent magnetic flux is available. Traverse of the full useful range of magnetic flux produces a fixed amount of energy in the pick-up head each cycle. Therefore, the maximum power output of the known pick-up devices is approximately proportional to the recorded frequency, and this effect must be compensated for by the introduction of special circuits in order to restore in the reproduced oscillations similarity to the recorded oscillations.

In most known applications of magnetic recording, the electric current representing the phenomenon to be recorded is passed directly through the main coil of the recording head producing magnetic impressions on the recording medium. A high frequency bias current simultaneously applied to a coil of the recording head makes magnetic impressions closely proportional to the recording current over a wide range of current. Arrangements of this general nature may be employed for producing magnetic records translatable by the present invention.

The usual means of reproducing the information which has been recorded in the form of magnetic impressions on the tape suffer more limitations than the recording process. The most commonly used pick-up device is similar to the recording head. In fact, a single unit often serves both purposes for audio applications. The magnetic flux from the recording medium threads along the magnetic circuit of the pick-up and through the pick-up coil. The only voltage produced in the pick-up coil is that due to the changes of magnetic flux. The rate of change of the flux and hence, for a given recording current, the voltage produced in reproduction is proportional to the frequency. If the frequency drops to zero, as for direct current, the output voltage becomes zero. For finite frequencies in the lower range where self-demagnetization is negligible, if the frequency doubles the output voltage doubles. Since output voltage is a function of frequency, and frequency during reproduction is a function of the speed of the magnetic medium past the pick-up head, the output voltage is also directly a function of the speed of reproduction. Thus, aside from the inaccuracies introduced by drive speed variations, the range of applications to which this form of magnetic recording and reproducing has been adaptable has been limited by the ability of integrating and equalizing networks to compensate for the inherent characteristics. These inherent limitations have rendered the usual reproducing means unsatisfactory in fields in which transients and direct quantities or components are of importance.

From this review of the characteristics of magnetic recording and reproducing systems, it should be evident to others, as it was to the present inventors, that for full exploitation of the possibilities of magnetic recording (for oscillographic purposes, for example) an improved system for translating magnetic records is needed, and preferably one producing a new pick-up device or head capable of producing an output voltage (1) proportional to the magnetomotive force exerted upon the pick-up head by the portion of the tape being examined, (2) of polarity dependent upon the polarity of the magnetomotive force, and (3) independent of the speed of recording or reproduction, and the present invention has among its aims the satisfying of these needs.

Thus, a general object of the present invention is to provide an improved method and means for translating such records in a manner overcoming certain of the difficulties heretofore experienced. To this end, more detailed objects of the invention, severally and interdependently, include (1) the provision of a dynamagnetic pick-up system that produces an output voltage proportional to the magnetomotive force applied to the pole pieces of the pick-up by the recording medium or other source employed, (2) one the output voltage of which is of a polarity dependent upon the polarity of the said magnetomotive force, (3) one the output voltage of which is independent of the velocity of the magnetic medium past the pick-up head, (4) one in which it is not necessary that the magnetomotive force vary to produce a voltage in the pick-up device, (5) one in which a constant unidirectional magnetomotive force produces directly a uniformly oscillating high frequency voltage, and indirectly by rectification and filtering a constant unidirectional voltage, (6) one in which it is possible to reproduce at any speed, phenomena which have been magnetically recorded at any other speed, (7) one in which oscillations recorded in the form of magnetic variations on tapes, wires, or other media at a given speed may be reproduced, or transcribed graphically, at a lower speed, permitting the use of rugged low speed pen-and-ink or equivalent forms of recorder as the final recording medium, where otherwise high speed recorders (usually dependent upon photographic techniques and processes) would be required, (8) one in which no compensation of output voltage for frequency is necessary, (9) one wherein no compensation or adjustment for velocity of the magnetic record past the pick-up is required, (10) one that is capable of producing a relatively high output voltage, and (11) one producing an oscillating output voltage that permits utilizing of the high gain possible in a tuned amplifier and consequently an amplifier of fewer stages for a given amount of amplification.

The invention consists in the novel methods, features, and combinations thereof herein disclosed, and its scope is more particularly pointed out in the appended claims.

Figure 1:
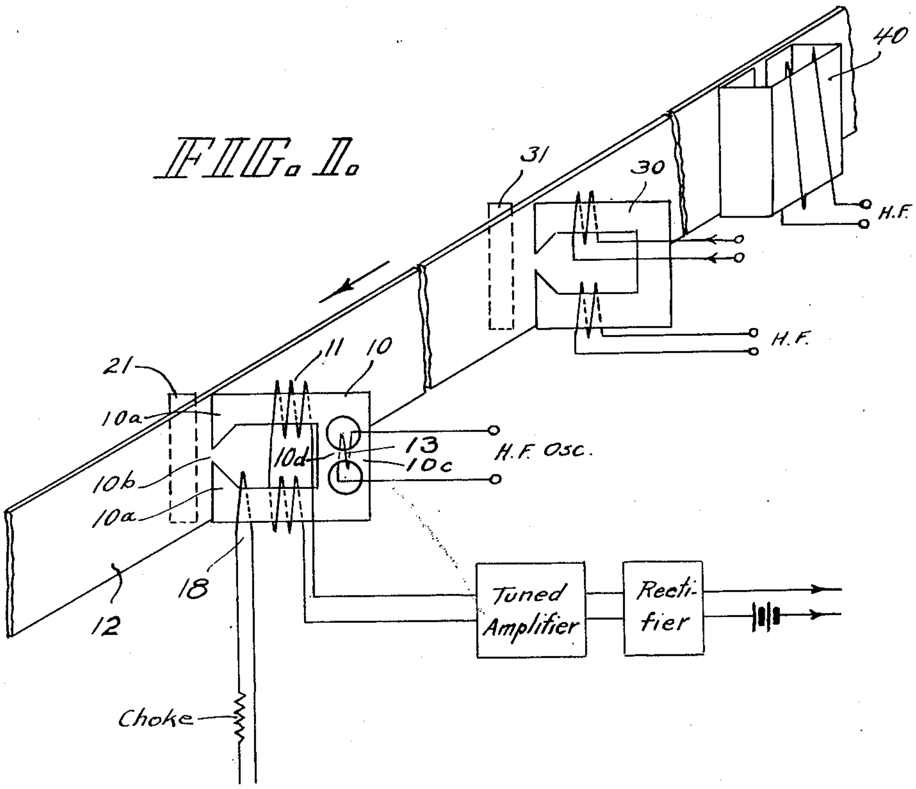
Fig. 1 is a schematic diagram illustrating the principles of the invention and a presently preferred form of pick-up device employing the same.

In the form exemplified in Fig. 1, the invention employs a magnetic circuit 10 threading a pick-up coil 11 and so arranged that the flux saturation of the magnetic circuit can be continually varied in a cyclic manner. Thus the magnetic induction through the dynamagnetic pick-up device 10, 11 from a magnetic recording tape or other source 12 can be made to vary continually, as rapidly as desired, and a varying or oscillating voltage is thereby produced in the pick-up coil 11, the envelope of such voltage being proportional to the magnetomotive force applied to the pole pieces 10*a* of the dynamagnetic pick-up device.

The invention is preferably practiced by varying the magnetic saturation of a portion of the magnetic circuit as exemplified in Fig. 1, this involving no moving parts, enabling maximum amplification, and limiting the frequency at which the reluctance can be varied only by hysteresis and eddy current losses in the magnetic circuit.

In the arrangement shown in Fig. 1, the magnetic circuit through the core 10 is divided for a short distance at the portion 10*c* into two paths which are linked by an auxiliary exciting coil 13 so arranged that the magnetic flux it produces circulates around the closed loop of the divided portion of the magnetic circuit, and does not link the main pick-up coil 11. As shown, the core or magnetic circuit 10 has the pick-up coil 11 mounted on a part thereof constituting the legs or pole pieces 10*a* defining the air-gap 10*b*, and the divided path 10*c* is located in another part of said magnetic path, there being a core portion 10*d* bridging from one of said two paths to the other, on which the exciting coil 13 is mounted. The auxiliary coil 13 is suitably excited, as from a conventional oscillator, at a frequency much higher than the frequency of the phenomena or intelligence being read or translated from the magnetic record 12.

By arrangements according to this method, only flux produced by the magnetomotive force externally applied to the pole pieces 10*a* of the pick-up effectively threads the pick-up coil 11. A voltage is produced therein proportional to the applied magnetomotive force by reason of the varying reluctance of the magnetic circuit 10—10*c*. In short, this arrangement produces in the coil 11 an oscillating voltage of a carrier frequency corresponding to the frequency of reluctance variation produced by the excitation of coil 13, modulated in accordance with the variations of magnetomotive force applied to the pole pieces 10*a* by the magnetic record 12.

Figure 2:
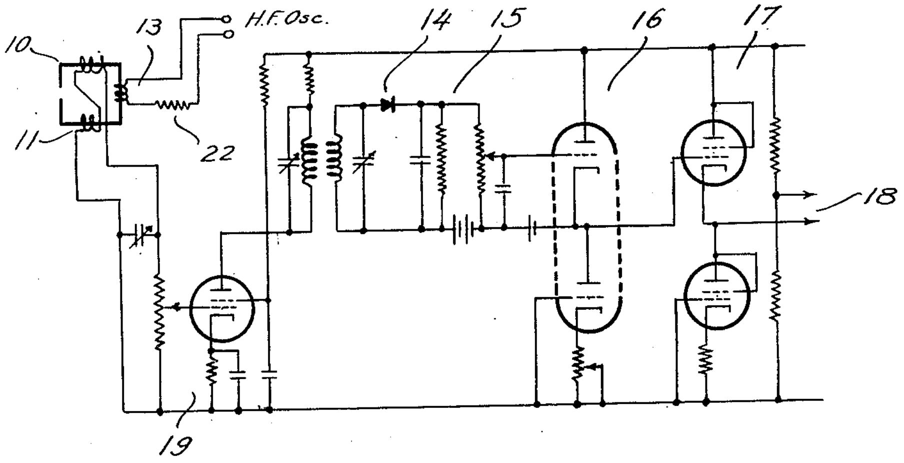
Fig. 2 is a schematic wiring diagram of the pick-up and a typical electronic amplifier operated thereby.

As indicated in Fig. 1, and by typical circuit diagram in Fig. 2, the oscillating voltage produced in the pick-up coil 11 may be rectified directly as by a conventional rectifier generally indicated at 14, and the rectified output if desired may be filtered at 15 and/or amplified by D. C. amplifier composing driver 16 and output amplifier 17 before delivery to output terminals 18 from which it is connected to operate any suitable reproducing or recording device, as heretofore indicated. Preferably, however, the voltage output of the pick-up coil, before supply to the rectifier 14 is amplified by a conventional tuned amplifier 19 tuned to twice the frequency of the current in the auxiliary exciting coil 13, or to any other harmonic thereof appearing in the magnetic circuit through the pick-up coil 11. As above noted, the nature of the output obtained enables the pick-up of the present invention to be combined with a tuned amplifier to thus obtain the advantage of the high gain thereof.

In the use of the device and method of the present invention for charting transient phenomena, the transient phenomena may first be automatically recorded on a continuous belt 12 of magnetic tape, wire, or other medium, travelling at such speed as is required to obtain adequate resolution of the oscillations. The magnetic record, which may be continuously made and thus include an indication of conditions just prior to the beginning of a transient, may then be transferred to a paper chart by means of the magnetic pick-up system of the present invention with its associated auxiliaries including the amplifier and recording meter. In transcribing, the chart may be driven faster than the magnetic medium in order to spread out the record as much as desired. As before mentioned, no compensation of output voltage for frequency is necessary, and no compensation or adjustment for velocity of the magnetic recording medium past the pick-up is required.

Preferably the magnetic circuits of both the record and pick-up heads are arranged to utilize a combination of transverse and perpendicular magnetization of the tape instead of the more common longitudinal magnetization. This is desirable to permit accurate reproduction of square waves or D.-C. pulses of unlimited duration. As far as the pick-up alone is concerned, greater sensitivity might be obtained by saturation of the entire magnetic circuit; however, the tape would then be demagnetized by the stray field set up. The balanced arrangement of the saturating part of the magnetic circuit serves to prevent appreciable stray field from the exciting frequency current from appearing at the pole faces which contact the magnetic tape. It also balances the exciting frequency component of voltage out of the main pick-up coil.

With the arrangement illustrated, the effective reluctance of the magnetic circuit is increased once for each half cycle of the exciting current so that the predominant voltage $e_2$ produced in the main pick-up coil is of twice the exciting current frequency and nearly proportional to the magnetomotive force exerted by the tape on the pole pieces of the pick-up.

Figure 3:
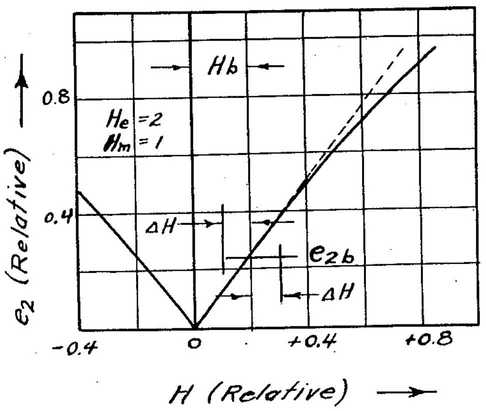
Fig. 3 is a diagram showing the relation of output voltage to magnetic force from the tape.

Considering $H_e$ as the impressed (exciting) magnetizing force, $H_m$ as the magnetizing force required to saturate the core, and H as the magnetizing force to be detected, the relation between $e_2$ and H for $H_e=2$ and $H_m=1$, shown in Figure 3, indicates that an operating point can be chosen where the curvature is relatively slight. Although any curvature in this characteristic affects the over-all calibration curve of the instrument, a small amount of curvature can be tolerated for power system application, since an error of 5 percent is common for automatic oscillographs and 2 percent for portable recording equipment.

Figure 3 also illustrates that the alternating voltage $e_2$ is zero when H is zero and increases as H increases in either a positive or a negative direction. This unpolarized characteristic may be overcome, and the most nearly linear operating point may be obtained at the same time, by applying a unidirectional magnetic bias indicated by $H_b$. This may be accomplished by adjusting the value of direct current in the polarizing coil (hereinafter described) or by adjusting the relation of the pick-up to a small permanent magnet. The output thus may be caused to vary about the point $e_{2b}$ by the field from the tape $\Delta H$.

The auxiliary D. C. polarizing coil 20, just referred to, is shown in Fig. 1 as associated with a part of the magnetic circuit 10 threading the pick-up coil 11.

The details of a physical embodiment of the present invention are set forth in technical paper 51-239 of the American Institute of Electrical Engineers entitled, "A Magnetic Tape Oscillograph for Power System Analysis," submitted to that Institute by the present applicants February 14, 1951, made available for preprint May 14, 1951, and approved for presentation at the A. I. E. E. summer general meeting, Toronto, Canada, on June 25-29, 1951, all within one year next preceding the filing of the present application. The said technical paper may be referred to for amplification of the present disclosure, and is incorporated as a part of the present disclosure by reference.

In that physical embodiment, permalloy was employed for the magnetic circuit of the pick-up head 10, and silicon iron for that of the record head 30, and small links of core material 21 and 31 were employed at the back side of the tape 12 opposite the pick-up head 10 and and record head 30, respectively, to reduce the magnetic reluctance of the circuits and reduce the influence of stray fields. In accordance with the preferred practice of the present invention, while the erase head 40 used embodied no new principle, and so need not be described in detail here, its orientation was arranged as shown in Fig. 1 so as to produce a saturating high frequency field in a longitudinal direction along the tape. Thus, even if minute magentized areas are left in the tape by the erase system at the higher tape speeds, this remanent magnetism is perpendicular to the active recorded fields.

In the physical embodiment described in the technical paper, a single oscillator operating at a frequency of 20 kilocycles was employed for (1) supplying the high frequency bias current to the terminals H. F. of the recording head 30, (2) supplying the high frequency exciting current to the terminals H. F. O.sc for the pick-up head 10, and (3) furnishing high frequency power to the terminals H. F. of the head 40 for the erase system.

A series resonant circuit was used with the erase head in order to simplify obtaining maximum power transfer. Delivery of the high frequency bias current to the record head was effected through a control rheostat and through a winding on the record head separate from the main recording winding in order to keep the recording circuit isolated as much as possible. A resistance 22 was used in series with the exciting coil of the pick-up head to swamp out the effect of nonlinear impedance of this saturating circuit on the wave form of the exciting current. The value of the exciting current, although not critical, was adjusted for optimum performance by this series resistor.

The amplifier contained a tuned section which operated at 40 kilocycles, the second harmonic frequency of the exciting current to the pick-up, a rectifier-detector, and a D.-C. amplifier to drive the pen and ink transcriber.

The tuned amplifier section was conventional but used a sharp cut-off amplifier tube 23 to maintain a more linear relation between input and output at high signal levels. Here too, the high amplification possible in tuned amplifiers was used to advantage. The first part of the detector-rectifier circuit was conventional, but in order to handle the transcription of D.-C. phenomena from the tape the detector was direct coupled to the D.-C. amplifier section. Here a D.-C. bias voltage was inserted to cancel the residual voltage produced by the unidirectional magnetic bias field applied to the pick-up head to obtain properly polarized performance and to shift operation to the best part of the magnetization characteristic illustrated by Figure 3. A schematic diagram of the electronic amplifier is shown in Figure 2.

A tape drive mechanism having an adjustable speed drive having a range of from 2 to 15 inches per second was provided. A moderate tape speed was used for recording and a low tape speed was used for transcribing in order to bring the frequency of the quantity being transcribed within the range of accurate response to the transcribing pen.

It is to be understood that the exemplary embodiments herein described are illustrative and not restrictive of the invention, the scope of which is defined in the appended claims. All modifications that come within the meaning and range of equivalency of the claims are therefore intended to be included therein.

We claim:

1. A dynamagnetic pick-up device comprising a magnetic core having an air gap therein, a pick-up coil threaded by a part of said core, another part of said core being divided into two magnetic paths, a core portion bridging from one of said two paths to the other, and an auxiliary means for excitation arranged on said bridging core portion, whereby alternating current excitation of said auxiliary coil operates to vary the magnetic saturation of the divided portion of the core and hence the reluctance of the core at the frequency of such excitation.

2. A dynamagnetic pick-up device according to claim 1 further comprising an auxiliary direct current polarizing coil mounted on a part of said core threading said pick-up coil.

3. A dynamic pick-up device comprising an effectively ring type magnetic core having an air-gap therein, a pick-up coil threaded by at least one part of said core, at least one other part of said core being divided into two magnetic paths, a core portion bridging from one of said two paths to the other, and means for excitation arranged on said bridging core portion, whereby the core affords two closed flux paths via the divided portion thereof from each end of said bridging portion to the other.

4. A dynamic pick-up device comprising an effectively ring type magnetic core having an air-gap therein, a pick-up coil threading at least one part of said core, at least one other part of said core being divided into two magnetic paths extending longitudinally of the core, a core portion bridging transversely from the mid-portion of one of said two paths to the mid-portion of the other and means for excitation arranged on said bridging coil, whereby the flux produced by said exciting coil at any given instant divides and flows in opposite directions in each of said two divided core sections.

5. A combined magnetic reproducing head and magnetic amplifier, comprising a core structure of magnetic material forming a closed rectangular magnetic loop, having opposite side and end legs, a bridge of magnetic material extending between opposite side legs of said rectangular loop, a single excitation winding encircling said bridge, a pair of magnetic arms extending from opposite end legs of said rectangular loop, said arms terminating adjacent one another to define between their terminals a non-magnetic gap adapted to cooperate with a magnetic record, and a signal output winding encircling one of said arms.

6. A dynamic pick-up device comprising a core structure of magnetic material forming a closed magnetic loop, having opposite side and end legs, a bridge of magnetic material extending between opposite side legs of said loop, an excitation winding encircling said bridge, a pair of magnetic arms extending from opposite end legs of said loop, said arms terminating adjacent one another to define between their terminals a non-magnetic gap adapted to cooperate with a magnetic record, and a signal output winding encircling at least one of said arms.

References Cited in the file of this patent

UNITED STATES PATENTS

| | | |
|---|---|---|
| 2,423,339 | Newman | July 1, 1947 |
| 2,536,260 | Burns | Jan. 2, 1951 |
| 2,608,621 | Peterson | Aug. 26, 1952 |